United States Patent [19]

Orr

[11] Patent Number: 4,611,796
[45] Date of Patent: Sep. 16, 1986

[54] AERODYNAMIC RETARDER

[75] Inventor: Larry W. Orr, King County, Wash.

[73] Assignee: Paccar Inc., Bellevue, Wash.

[21] Appl. No.: 704,309

[22] Filed: Feb. 21, 1985

[51] Int. Cl.⁴ .......................... B62D 35/00; B60T 1/16
[52] U.S. Cl. .................... 296/1 S; 188/270; 180/903
[58] Field of Search .................. 296/1 S, 91; 188/270; 180/903

[56] References Cited

U.S. PATENT DOCUMENTS

| | | | |
|---|---|---|---|
| 2,823,072 | 2/1958 | Podolan | 296/91 |
| 2,979,165 | 4/1961 | McCambridge | 296/1 S |
| 3,216,536 | 11/1965 | Henschel | 188/270 |
| 3,243,192 | 3/1966 | Franzel | 296/1 R |
| 3,455,594 | 7/1969 | Hall et al. | 296/1 S |
| 3,934,923 | 1/1976 | Lissaman et al. | 296/1 S |
| 4,006,931 | 2/1977 | Groves | 296/1 S |
| 4,102,458 | 7/1978 | Kangas | 296/1 S |
| 4,160,494 | 7/1979 | McCambridge | 296/1 S |
| 4,375,898 | 3/1983 | Stephens | 296/1 S |

FOREIGN PATENT DOCUMENTS

| | | | |
|---|---|---|---|
| 2942142 | 4/1981 | Fed. Rep. of Germany | 296/1 S |
| 1526860 | 10/1978 | United Kingdom | 296/1 S |
| 2098152 | 11/1982 | United Kingdom | 296/1 S |

OTHER PUBLICATIONS

Wards Auto World, vol. 19, No. 8, Aug. 1983, p. 26E.

Primary Examiner—Robert B. Reeves
Assistant Examiner—Dennis H. Pedder
Attorney, Agent, or Firm—Seed and Berry

[57] ABSTRACT

An apparatus and method for aerodynamically braking a tractor-trailer combination utilizing a centrally pivoted, fast-acting door within a roof-mounted aerodynamic fairing to selectively expose and conceal the front surface of the trailer, which is masked by the fairing, and in one embodiment, to operate the door cooperatively with the vehicle's brake system.

10 Claims, 3 Drawing Figures

AERODYNAMIC RETARDER

DESCRIPTION

1. Technical Field

The present invention relates to structures for changing the aerodynamic characteristics of tractor-trailer vehicles. More specifically, this invention relates to an apparatus and method for effecting aerodynamic braking of a tractor-trailer vehicle utilizing the front surface of a trailer which extends above the cab of a tractor.

2. Background Art

Various fairings and streamlining devices are currently available to reduce the aerodynamic drag on tractor-trailer combinations aerodynamically masking the discontinuity in height between the top of the cab and the top of the trailer or cargo container. These fairings are either mounted on top of the cab or on the front of the trailer. In addition to reducing aerodynamic drag, recent advances in tire technology have reduced the rolling resistance of such vehicles. Heavy trucks now require less power to maintain a given highway speed. The result of this trend is that due to the reduced aerodynamic and tire drag of heavy trucks, additional loads are placed on the service brakes. Little thought as been given to utilizing increased air resistance to assist the service brakes in retarding the forward motion of a truck.

At least one cab-mounted deflector, as shown in U.S. Pat. No. 4,102,548, is adjustable to vary the wind deflection over the trailer for maximum fuel efficiency. It is conceivable that when such a device is fully retracted, or in a position to maximize aerodynamic drag, some braking effect is achieved. However, these devices are not designed to quickly adjust from maximum to minimum resistance so as to be effective as braking systems. Furthermore, the structure is hinged at one end and activated at the other end and is inherently inefficient for executing quick changes from maximum to minimum resistance.

Although various other types of spoilers and flaps have been designed to perform aerodynamic braking cooperatively with a vehicle's service brakes, such systems utilize relatively small reaction surfaces. These systems are also necessarily complex.

The present invention overcomes the disadvantages of the above devices by utilizing the front face of an attached trailer or cargo section to provide a large blocking surface to resist the flow of air and by selectively aerodynamically shielding this surface with a quick-acting door. The present invention is preferably designed to work cooperatively with some component of the vehicle, such as service brakes, which senses desired deceleration of the vehicle.

DISCLOSURE OF INVENTION

It is an object of the invention to provide an aerodynamic brake which disables a portion of an aerodynamic deflector to expose the front of a trailer as a reactive surface.

It is also an object of this invention to provide a fast-acting deflector disabling device to expose the rearward cargo carrying compartment of the vehicle.

It is a further objective of this invention to provide an aerodynamic brake which is actuated with the application of the tractor's service brakes, engine retarder, drive train retarder, etc.

The invention achieves these objectives by employing a quick-acting door, centrally pivoted, in a standard roof-mounted deflector or fairing. Preferably, the operation of the door is cooperative with other speed-reducing actuators of the vehicle, such as the tractor service brake control system.

In one embodiment, an air-deflecting fairing or deflector is mounted on top of a cab to provide a streamlined shape, reducing the aerodynamic drag of the trailer. A door is provided in the front of the fairing to selectively alter the aerodynamic function of the fairing from maximum to minimum efficiency. The door is opened to expose the front section of the trailer to the air stream, thereby achieving aerodynamic braking; the door is closed to divert the air stream over the top of the trailer, thereby achieving maximum aerodynamic efficiency, as with a standard fairing.

The door is pivoted about an axis passing through the center line of the aerodynamic forces acting on the door so that regardless of the position of the door, the aerodynamic forces acting thereon will substantially be in equilibrium, neither tending to open nor close the door. This allows a lower force, faster acting actuator to open and close the door. The fast-acting feature allows the door to operate manually or cooperatively with the tractor's service brake (or engine-drive train retarding system) so that when the braking occurs, the door will open, and when the braking is deactivated, the door will close.

In addition to the quick response time of the present invention, the invention achieves superior aerodynamic braking effect by employing a larger aerodynamic braking surface than other available devices. When the door of the present invention is opened, the full available frontal area of the trailer or other cargo container is exposed to the airflow.

BEST MODE FOR CARRYING OUT THE INVENTION

Referring now in detail to the drawings, like numerals herein designate like numbered parts in the figures.

Figure 1:
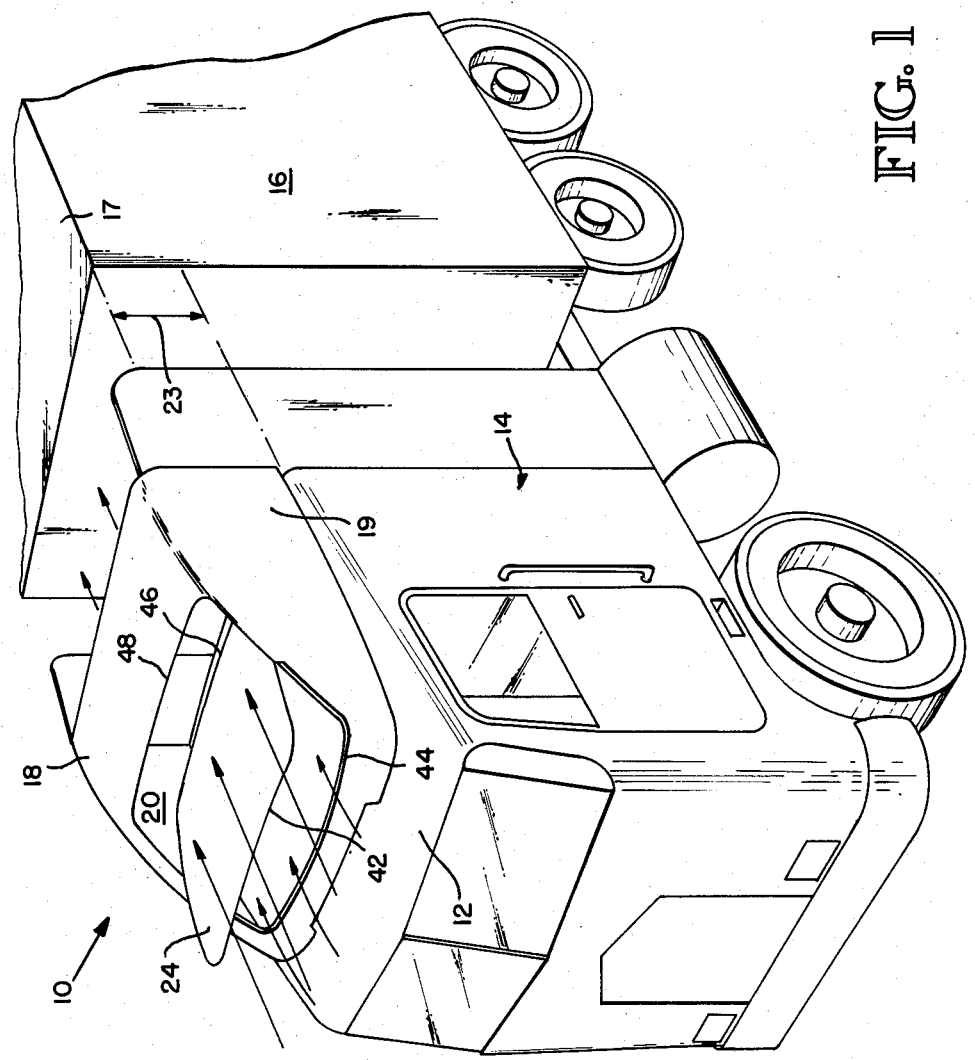
FIG. 1 is a perspective view of the aerodynamic retarder is use on a typical tractor-trailer combination.

In FIG. 1, an aerodynamic deflector or fairing, in accordance with the present invention, is generally indicated at 10. The deflector is shown mounted on the roof 12 of a tractor cab 14 which is coupled to a conventional trailer 16. The principles are also applicable, however, to single-chassis trucks having high covered cargo compartments. A retarder 24 is shown in a retarding or aerodynamic braking mode in the center of the deflector. The retarder and deflector can be made from a variety of materials, including those presently employed in the construction of aerodynamic fairings.

The deflector 10 has a top part 18, a left side 20 and a right side 19. The top side is curved, forming a substantially vertical surface near the front of the cab 14 and a substantially horizontal surface near the rear of the cab. The degree of curvature of the top is determined so that the height difference 23 between the top of the cab 12 and the top of the trailer 17 is aerodynamically masked.

The retarder or door 24 extends horizontally, nearly the full width of the deflector, and extends vertically sufficiently to expose substantially all of the height difference 23 between the cab and the trailer when the door is opened.

Figure 2:
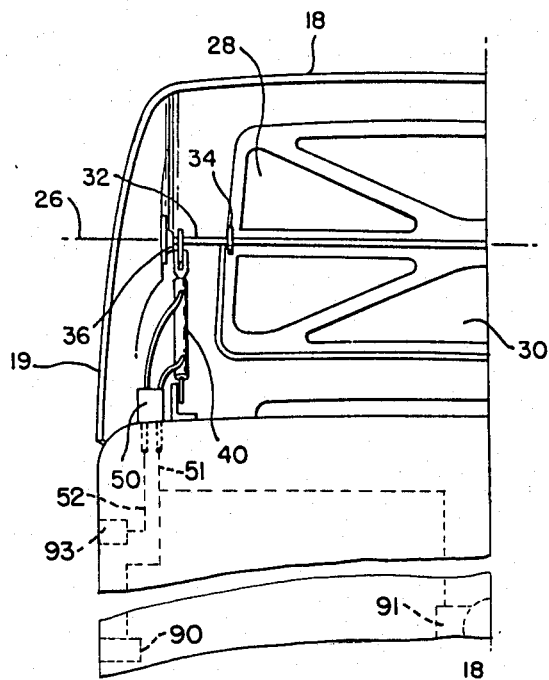
FIG. 2 is a rear elevation of the aerodynamic retarder showing one-half of the retarder and the central position of the pivot axis of the retarder.

As shown in FIG. 2, the door 24 is pivoted about a central axis 26 so as to divide the door into an upper half 28 and a lower half 30. A shaft 32 passes through this central axis. A door bracket 34 is attached to each inside edge of the door along the central axis and is fixed to the shaft so that rotation of the shaft will cause the door to operate. The shaft is rotatably supported on the deflector by bearings 36. It is to be understood that the bracket and bearing structure shown in FIG. 2 for the left side of the invention is to be duplicated on the right side of the invention.

Figure 3:
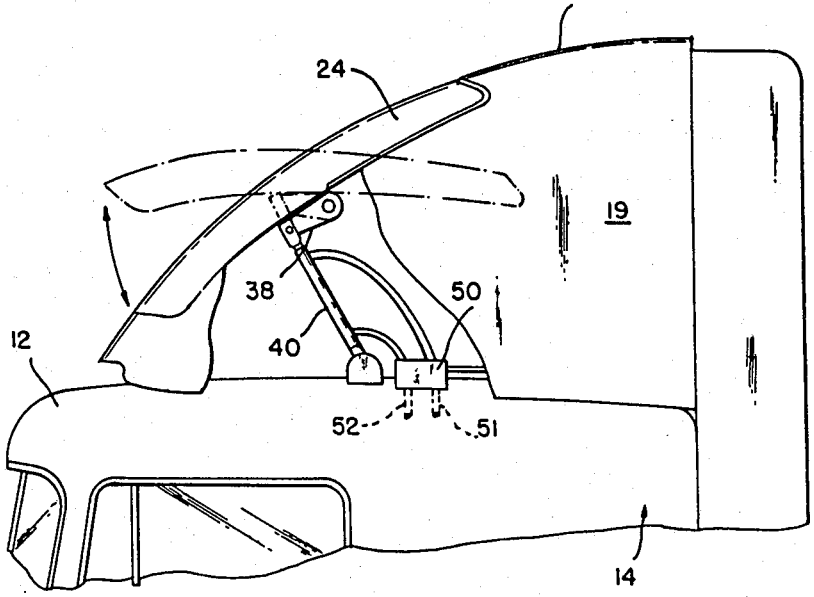
FIG. 3 is a side elevation of the aerodynamic retarder with a portion cut away to reveal the actuating mechanism of the invention.

In FIG. 3, one end of a crank or actuating arm 38 is rigidly attached to the shaft 32 between the shaft bearing and the door brackets so that movement of the crank will cause the shaft to rotate. The free end of the crank is attached to the piston end of an actuating mechanism or piston-cylinder 40. The other end of the actuating mechanism is attached to the roof of the tractor cab. As shown in FIG. 1, the lower half 30 of the door swings upward, while the upper half 28 swings downward. The leading or front edge 42 of the door is beveled, as is the corresponding edge 44 of the top part 18 to form a good air seal. Similarly, the trailing or rear edge 46 of the door is beveled to fit the bevel of corresponding edge 48 of the top part. In addition to forming a good air seal, the beveled edges provide a stop to prevent the door from opening in the direction opposite to that described. It is preferred to apply a slight closing pressure from the piston-cylinder 40 to bias the door closed against the beveled edges of the top part 18.

The aerodynamic forces operating on the door are in substantial equilibrium, tending to neither open nor close the door regardless of the position of the door. Therefore, the actuating arm or crank 38 can be relatively short and a fast-acting piston-cylinder 40 need undergo only a small displacement to fully open or close the door.

When the door 24 is in the closed position, as indicated by the solid lines in FIG. 3, the excess height 23 of the trailer over the cab, as shown in FIG. 1, is aerodynamically masked or shielded, thereby preventing minimum aerodynamic drag. When the door is open, as shown in FIG. 1 and by broken lines in FIG. 3, the height difference between the roof of the cab and the top of the trailer is exposed, providing maximum drag and an aerodynamic braking effect.

In the preferred embodiment, the actuating mechanism 40 is controlled or activated by the service brake control valve of the tractor and thus operates when the brake is appled. This is shown schematically in FIG. 3 by a conventional solenoid-actuated valve 50 whose position is controlled by a signal from the schematically shown service brake actuator or control 90, which indicates the desire for braking, carried by an electrical line 51. The valve can also be operated by an electrical line 52 coupled to a manual control 93 in the cab. When the brake is applied, the door 24 will open, maximizing the aerodynamic drag of the tractor-trailer combination; when the brake is deactivated, the door will close, minimizing the drag of the tractor-trailer combination. The actuating mechanism can be a pneumatic piston and cylinder directly energized by pressure from the service brake control valve. The activating mechanism can also be an electrically energized solenoid or a hydraulically operated piston controlled electronically in cooperation with the tractor brake electrical system. The actuating mechanism for the retarder can also be controlled by a conventional engine or drive train retarder 91 (shown schematically) or manually by the operator in the cab.

It will be appreciated that other variations and embodiments of the invention are also contemplated. These variations utilize the same principles and concepts as the preferred embodiment.

I claim:

1. An aerodynamic retarding device for a tractor-trailer having a cab and a high rearward cargo compartment that extends upwardly above the cab, comprising:
    an air-deflecting fairing mounted on top of the cab;
    a door within said fairing covering an opening in the fairing that is the major frontal surface area of the fairing, movable relative to said fairing to an open position for exposing a large surface of the cargo compartment for creating aerodynamic drag and to a closed position to reduce drag;
    a quick-acting actuating mechanism operatively associated with said door for rapidly opening and closing the door; and
    means for energizing said actuating mechanism in response to a signal indicating the desire for braking of the tractor-trailer to open said door to expose the rearward cargo compartment when braking is desired and to close said door to deflect air over the cargo compartment when braking is not desired.

2. The invention of claim 1 wherein said door is attached along a horizontal, vertically central axis to a shaft that is pivoted by said actuating mechanism wherein the door is exposed to air forces generally equally above and below the shaft.

3. The invention of claim 1 wherein said actuating mechanism is a pneumatically operated piston-cylinder.

4. The invention of claim 1 wherein said means for energizing said actuating mechanism is an electrical solenoid-operated valve.

5. The invention of claim 1, including a service brake means and wherein the signal sensed is in response to actuation of the service brake means such that application of the service brake will open said door.

6. A method for aerodynamically retarding the forward motion of a vehicle having a rearward cargo carrying section that extends upwardly above the passenger section, comprising the following steps:
    mounting an air-deflecting fairing above the passenger section to reduce drag on the cargo section;
    providing a door within said fairing to selectively direct airflow through the fairing to increase drag on said cargo section or divert the air above the cargo section when said door is in open and closed positions, respectively;
    rapidly opening said door in the fairing while the vehicle is moving in response to a signal to begin braking the vehicle so as to quickly apply a retarding drag force on the rearward cargo carrying section to retard the forward motion of the vehicle.

7. The method of claim 6 wherein said step of opening said door is automatically controlled by a signal indicating actuation of the engine retarder of said tractor.

8. The method of claim 6 wherein said step of opening said door is automatically controlled by and acts cooperatively with the drive train retarder of said vehicle.

9. The method of claim 6 wherein said door is a single panel pivotally mounted about an axis that is colinear with the center line of the aerodynamic forces acting on said door so that said forces tend to neither open nor close said door, and wherein said step of rapidly opening said door includes rapidly pivoting the door about said axis.

10. A method of aerodynamicaly retarding a vehicle having an operator's cab and a rearward, vertical cargo carrying compartment, said cab provided with a deflector for deflecting airflow around the rearward, vertical cargo carrying compartment, comprising the following steps:

selectively deflecting the airflow around the rearward, vertical cargo carrying compartment for decreasing drag;

selectively and rapidly creating an opening within the deflector for exposing the rearward, vertical cargo carrying compartment to the airflow for increasing drag; and initiating said step of creating an opening responsive to braking demand on the vehicle.

* * * * *